United States Patent [19]

Takubo et al.

[11] 4,409,619
[45] Oct. 11, 1983

[54] TELEVISION CAMERA WITH AN ELECTRONIC VIEW FINDER

[75] Inventors: Takayuki Takubo; Takeshi Okano, both of Yokohama, Japan

[73] Assignee: Victor Company of Japan, Limited, Yokohama, Japan

[21] Appl. No.: 259,458

[22] Filed: Apr. 30, 1981

[30] Foreign Application Priority Data

Apr. 30, 1980 [JP] Japan .............................. 55-59516[U]

[51] Int. Cl.³ .............................................. H04N 5/26
[52] U.S. Cl. .................................... 358/224; 358/229
[58] Field of Search ............... 358/209, 224, 229, 225; 352/34, 242, 243; 354/219, 223

[56] References Cited

U.S. PATENT DOCUMENTS

| | | | |
|---|---|---|---|
| 2,679,196 | 5/1954 | Sochor | 352/242 |
| 3,627,923 | 12/1971 | Bachmann | 358/224 |
| 3,845,238 | 10/1974 | Schneider | 358/229 |
| 3,913,116 | 10/1975 | Kastner | 352/243 |
| 4,037,763 | 7/1977 | Turchen | 358/229 |
| 4,083,480 | 4/1978 | Lee | 358/229 |
| 4,128,322 | 12/1978 | Stemme | 354/219 |
| 4,318,133 | 3/1982 | Ohtake | 358/229 |

FOREIGN PATENT DOCUMENTS 632726 12/1949 United Kingdom .
1249266 10/1971 United Kingdom .
1381094 1/1975 United Kingdom .

OTHER PUBLICATIONS

Journal "Radio Mentor", No. 9, 1972, p. 402, FIGS. 3 & 4.

*Primary Examiner*—Michael A. Masinick
*Attorney, Agent, or Firm*—Lowe, King, Price & Becker

[57] ABSTRACT

A portable television camera is equipped with an additional electronic view finder having an eyepiece arranged to project outside the camera body in a direction perpendicular to a longitudinal center axis of the camera body. The electronic view finder is pivotally mounted on the top of the camera body to be horizontally rotated causing the projecting eyepiece to be positioned above the the top of the camera body when unused. In one a mounting member having two L-shaped arms is employed for the attachment of the electronic view finder, utilizing a threaded hole at the bottom of the camera body which is not originally designed to carry an electronic view finder thereon. The electronic view finder may be used with or without a shouldering aid which can be attached to the bottom of the camera body.

14 Claims, 7 Drawing Figures

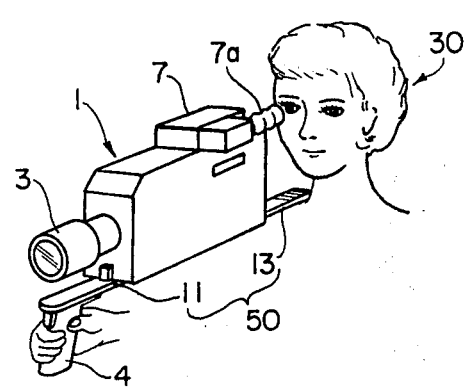
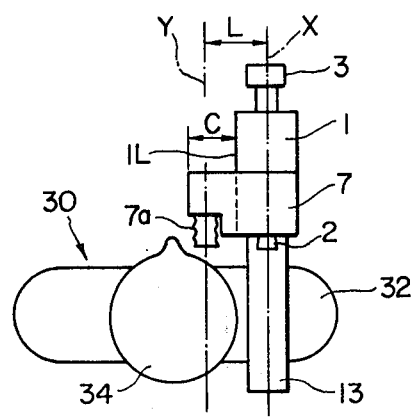
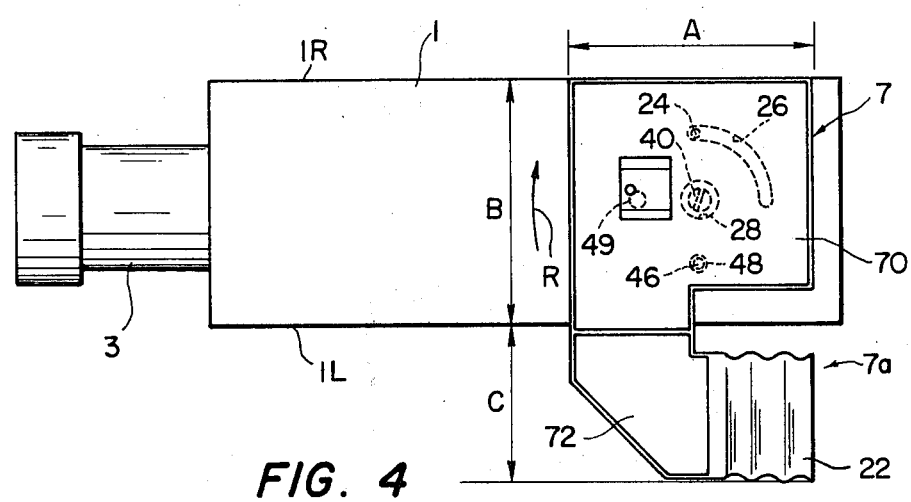
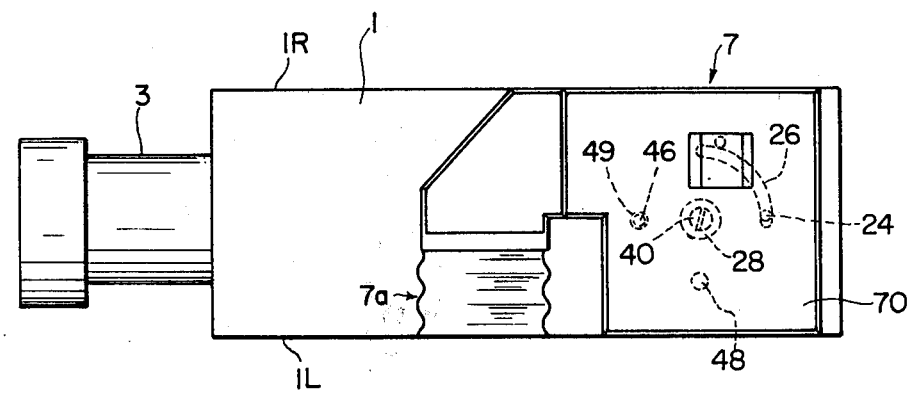

TELEVISION CAMERA WITH AN ELECTRONIC VIEW FINDER

BACKGROUND OF THE INVENTION

This invention relates generally to television or video cameras, and more particularly, the present invention relates to hand held television cameras having an additional electronic view finder.

Television cameras for domestic use are getting popular now as video tape recorders have been popularized. Recent portable television cameras are small in size and light in weight so that they are as handy as customary eight-millimeter movie cameras. Most conventional television cameras are equipped with a view finder of TTL (through the-lens) type because such a view finder is so small and light compared to an electronic view finder having a picture tube that it fits such a handy camera. However, it is to be noted that there is a great difference in usage between television cameras and eight-millimeter cameras. Namely, in contrast to the short filming interval, such as several minutes, of eight-millimeter movie cameras, the maximum shooting interval of television cameras is two to six hours depending on the length and reeling speed of the video tape. When a user performs a long time shooting, by gripping a hand grip of the portable television camera, he will be tired, and thus stable shooting is difficult. Some large size video cameras, therefore, have a shouldering aid or supporter so that the camera can be carried on a user's shoulder. However, these conventional large size television cameras having such a shouldering aid are not handy because they have been originally designed to be used by being carried on a user's shoulder.

One of the inventors of the present invention has already invented a shouldering aid for a portable television camera, and filed patent applications in Japan (55-59513, 55-59514 and 55-59515). This shouldering aid invented by one of the present inventors has a base member arranged to be attachable to the bottom portion of a portable television camera body, and a shoulder pad connected to the base member. The shoulder pad may be foldable, while the hand grip of the television camera, which hand grip is of detachable type, is detached from the camera body to be attached to a front portion of the base member of the shouldering aid. A mechanical linking means is provided for interlocking a manipulation knob or trigger attached to the hand grip and a start switch of the television camera body. When a portable television camera equipped with such a shouldering aid is carried on a user's shoulder, it is difficult to use an original view finder of TTL type, which is built in the camera body, because the eyepiece of such a view finder will be positioned just above the user's shoulder. Namely, the user or shooter has to bend or stretch his neck to look through the eyepiece.

Therefore, it is preferable to use an additional electronic view finder having a picture tube when the television camera is carried on a user's shoulder by means of such a shouldering aid, so that the user does not have to bend his neck to look through an eyepiece of the electronic view finder. Namely, the eyepiece of such an additional electronic view finder is located at one side of the camera body, projecting outside the camera body. The electronic view finder may be either directly mounted on the top portion of the camera body or by means of a mounting or attaching member fixedly connected to the camera body. Although the additionally provided electronic view finder can satisfactorily operate in use, when it is intended to carry the camera in nonuse or to restore the camera in a casing, the electronic view finder would be an obstacle because the eyepiece thereof is projecting from one side of the camera body. Therefore, a television camera equipped with such an additional electronic view finder is undesirably bulky, and thus the mobility of the portable television camera is apt to be deteriorated.

SUMMARY OF THE INVENTION

This invention has been developed in order to improve the mobility of such a portable television camera equipped with an electronic view finder.

It is, therefore, an object of the present invention to provide a new and useful television camera equipped with an additional electronic view finder, in which the view finder is pivotally mounted on the body of the television camera so that the eyepiece portion of the electronic view finder, which eyepiece projects outward from the camera body in use, can be placed above the camera body when unused.

According to a feature of the present invention, the electronic view finder may be either directly attached to the top portion of the camera body or by means of a mounting member which can be securely attached to the camera body. The electronic view finder may be used together with the above-mentioned shouldering aid or without the shouldering aid.

BRIEF DESCRIPTION OF THE DRAWINGS

The object and features of the present invention will become more readily apparent from the following detailed description of the preferred embodiments taken in conjunction with the accompanying drawings in which:

FIG. 1 is a perspective view of an embodiment of a television camera according to the present invention;

FIG. 2 is an explanatory top plan view of the television camera of FIG. 1;

FIG. 3 is a top plan view of the television camera of FIGS. 1 and 2, showing a condition that an electronic view finder attached to the camera body is in use;

FIG. 4 is a top plan view of the television camera of FIGS. 1 to 3, showing another condition that the electronic view finder has been rotated 90 degrees with respect to the camera body when unused;

Similar or corresponding elements and parts are designated at like numerals throughout the drawings.

DETAILED DESCRIPTION OF THE PREFERRED EMBODIMENTS

Figure 5:
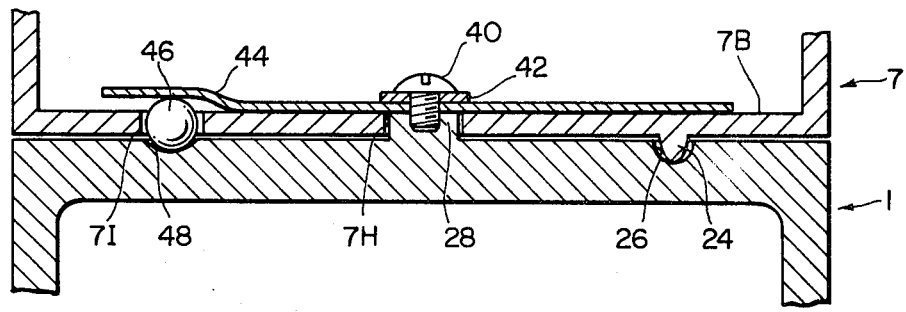
FIG. 5 is a cross-sectional partial view showing the way of connection between the electronic view finder and the television camera body of FIGS. 1 to 4.

Reference is now made to FIG. 1 which shows a perspective view of an embodiment of the television camera according to the present invention. A portable television camera generally designated at a reference numeral 1 is equipped with a shouldering aid 50 attached to the bottom of the camera body 1 and an electronic view finder 7 mounted on the top of the camera body 1. The shouldering aid 50 comprises a base member 11 and a shoulder pad member 13 pivotally connected to the base member 11. A hand grip 4, which has been detached from the camera body 1, is attached to a front portion of the base member 11. The television camera equipped with the shouldering aid 50 and the electronic view finder 7 is referred to as a television camera assembly hereafter. The television camera assembly may be carried on a shoulder of a user or shooter 30, by placing the shoulder pad member 13 on his shoulder, while the hand grip 4 is gripped by a hand of the user. A reference numeral 3 is a lens of the camera 1.

Although the electronic view finder 7, which is electrically connected to the camera body 1 by means of a cable (not shown), is pivotally mounted on the camera body 1 so that it can be rotated horizontally as will be described hereinlater, let us assume that the electronic view finder 7 is fixedly mounted on the camera body 1 for a better understanding of the object and features of the present invention.

Referring to FIG. 2, the television camera assembly is carried on a user's right shoulder 32. A reference numeral 34 indicates the head of the user 30. Since the television camera assembly is supported by not only the user's hand but also by his right shoulder 32, long time shooting can be satisfactorily performed without hastening fatigue of the shooter 30, while stable pictures are ensured. However, an eyepiece of a view finder 2 of TTL type, which is built in the camera body 1, cannot be satisfactorily used when the camera assembly is carried on the shoulder 32 of the user 30 unless the user 30 bends or stretches his neck to look through the eyepiece of the TTL finder 2. On the other hand, the electronic view finder 7 has an eyepiece portion 7a which will be located just in front of the right eye of the user 30. Namely, the eyepiece portion 7a projects outwardly from one side of the camera body 1 when viewed from the top as best seen in FIG. 2. A line X is a center line passing through the center of the camera body 1 and the center of the shoulder pad member 13 of the shouldering aid 50, while another line Y passes through the center of the eyepiece 7a of the electronic view finder 7 and is parallel to the center line X. The distance between these two lines X and Y is indicated by L. This distance L is selected to be a value corresponding to a distance between a given point on the user's right shoulder 32 and his right eye. To this end, the eyepiece portion 7a of the electronic view finder 7 projects leftward from the left side of the camera body 1 by a given distance. The distance between an outer most portion of the eyepiece portion 7a and the left side wall 1L of the camera body 1 is indicated at C. Although the embodiment of the television camera assembly is designed to be placed on a right shoulder of a shooter, if desired, a television camera assembly can be designed to be carried on a left shoulder by arranging the eyepiece portion 7a at the other side.

With this provison, the shooter 30 does not have to bend his neck to look through into eyepiece portion 7a of the electronic view finder 7. However, as described in the above, when it is intended to simply carry the camera assembly, or to restore the same in a suitable casing, the above-mentioned projecting eyepiece portion 7a of the electronic view finder 7 would be an obstacle if the electronic view finder 7 were fixedly connected to or mounted on the camera body 1. In accordance with the present invention, therefore, the electronic view finder 7 is pivotally mounted on the top of the camera body 1 so that the electronic view finder 7 can be horizontally rotated 90 degrees, causing the eyepiece portion 7a to be placed above the camera body, when unused.

Reference is made to FIGS. 3 and 4 which show top plan views of the television camera body 1 equipped with the electronic view finder 7 respectively in using condition and in nonusing condition. The electronic view finder 7 comprises a housing 70, a plane mirror portion 72 and a bellows portion 22 functioning as the eyepiece portion 7a. In the housing 70 are assembled an electronic circuit, a picture tube and input terminals (all not shown). A picture on the picture tube can be seen through the eyepiece portion 7a after being reflected at the plane mirror (not shown) in the plane mirror portion 72. Therefore, a view which is exactly the same as the view shot by the television camera can be seen through the eyepiece portion 7a. The reference numeral 28 is a boss integrally formed with the top portion of the camera body 1, and the electronic view finder 7 is arranged to rotate around the boss 28. An arcuate recess or groove 26, which functions as a guide groove, is formed on the top of the camera body 1 centered on the boss 28. The arcuate groove 26 extends over approximately 90 degrees in terms of a center angle viewed from the boss 28. A projection or guide pin 24 is integrally formed with a bottom portion of the housing 70 of the electronic view finder 7, and is slidably engaged with the guide groove 26. With this arrangement the electronic view finder 7 is rotatable in a direction of a curved arrow R in FIG. 3. In the condition of FIG. 3, namely, when the electronic view finder 7 is to be used, the guide pin 24 is positioned at the left end of the guide recess 26 when viewed from the top, and as the electronic view finder 7 is rotated in the direction of the curved arrow R, the electronic view finder 7 assumes a position of FIG. 4. At this time, the guide pin 24 is positioned at the right end of the guide groove 26. This means that the electronic view finder 7 has been rotated 90 degrees clockwise when viewed from the top. After the clockwise rotation, the eyepiece portion 7 is placed above the top of the television camera body 1, and therefore, nothing is being projecting outside from both sides of the camera body 1.

This point will be further described with reference to FIGS. 3 and 4. The width of the television camera body 1 is expressed in terms of B, while the length of the electronic view finder 7 measured in a direction perpendicular to the view seen in the picture tube (not shown) through the eyepiece portion 7a is expressed in terms of A. The distance between the left side 1L of the camera body 1 and the outer most portion of the eyepiece 7a is expressed in terms of C. In this embodiment, the value of A substantially equals the value of B. In order that nothing projects outside the both side walls 1R and 1L of the camera body in unused condition, a relationship of $A \leq B$ has to be satisfied. Although in the case that $A > B$, one or both sides of the electronic view finder 7 projects outside the camera body 1, if the relationship of $A < B + C$ is satisfied, an effect of size reduction can be expected.

The above-mentioned pivotal connection between the top of the camera body 1 and the bottom of the electronic view finder 7 will be further described with reference to FIG. 5 which is a schematic cross-sectional partial view. The housing 70 of the electronic view finder 7 has a bottom plate 7B having a through-hole 7H at the center thereof so that the above-mentioned boss 28 penetrates the same. A leaf spring 44 is provided on the boss 28 and on the upper surface of the bottom plate 7B, and a through-hole (no numeral) is made so that a screw 40 engages through the leaf spring 44 with a threaded hole made at the center of the boss 28. A washer 42 is interposed between the head of the screw 40 and the leaf spring 44. The leaf spring 44 extends to support a ball 46 thereunder, biasing it downward. The ball 46 is received in a through-hole 7I which is located at the other side of the above-mentioned guide pin 24 with respect to the boss 28 (see FIGS. 3 and 4 also). Two semispherical recesses 48 and 49 are formed on the top of the television camera body 1 as shown in FIGS. 3 and 4. When the electronic view finder 7 assumes the position of FIG. 3, the ball 46 is received in the first recess 48 as shown in FIG. 5, and on the other hand, when the electronic view finder 7 assumes the position of FIG. 4, the ball 46 is received in the second recess 49. Since the ball 46 is biased downward by the leaf spring 44, the ball performs snap action by respectively being received in one of the recesses 48 and 49. With this arrangement, the electronic view finder 7 is stationarily held at one of the positions of FIGS. 3 and 4. Although the guide pin 24 is provided to the electronic view finder 7 to be engaged with the arcuate groove 26 formed on the top of the camera body 1 in this embodiment, such a guide pin may be provided to the camera body 1 so as to be received in an arcuate groove formed at the bottom of the electronic view finder 7.

In the above-described embodiment, the electronic view finder is directly attached to the top of the camera body. However the present invention is not limited to such an arrangement. Namely, a suitable attaching member or mounting member may be employed for mounting the electronic view finder 7 on a portable television camera body which does not have any particular arrangement for mounting the electronic view finder 7.

Figure 6:
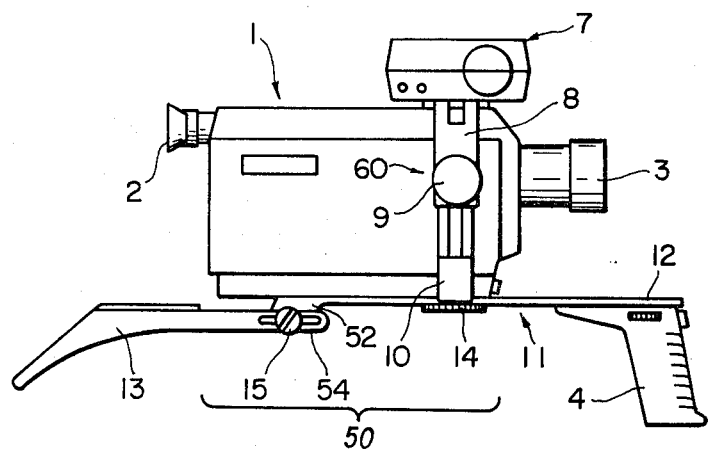
FIG. 6 is a side view of another embodiment of the television camera according to the present invention.
Figure 7:
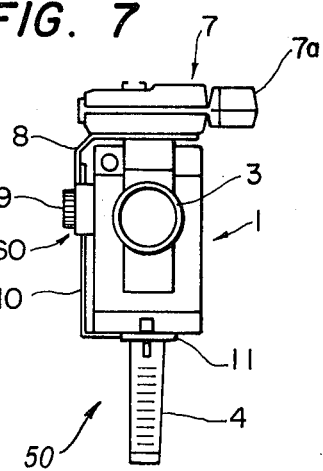
FIG. 7 is a front view of the television camera of FIG. 6.

Hence, reference is now made to FIGS. 6 and 7 which respectively show a side view and a front view of another embodiment of the television camera assembly according to the present invention. This embodiment comprises a shouldering aid generally designated at a reference 50, which is constructed of an elongate base member 11 and a curved shoulder pad member 13. The base member 11 is made of an aluminum diecasting, and a through-hole is made at a point in the vicinity of the center in its longitudinal length. A screw 14 is arranged to penetrate the through-hole to be engaged with a threaded hole (not shown) made at the bottom of the camera body. This threaded hole is one originally provided for receiving a screw 12 of the hand grip 4. Another threaded hole is made at a point in the vicinity of the tip of the base member 11 for receiving the screw 12 of the hand grip 4. Namely, the hand grip 4 has been detached from the camera body 1 to be attached to the base member 11. The other end, which will be referred to as a rear end, of the base member 11 has two wall portions 52 extending in a direction perpendicular to the plane of the base member 11. A threaded hole is made in each of the wall portions 52. The shoulder pad member 13 has at its tip portion, two projecting portions 54 which are separated by a distance a little greater than the space between the wall portion 52 of the base member 11. Namely, the tip portion of the shoulder pad member 13 is of fork-like shape. The shoulder pad member 13 is made of a suitable synthetic resin. Each of the projecting portions 54 has an elongate through-hole or slit 16 through which a screw 15 can be inserted to screw the shoulder pad member 13 to the wall portions 52 of the rear end of the base member 11. The shoulder pad member 13 is so curved that it will fit a shoulder of a user.

In order to mount the electronic view finder 7 having a monitor picture tube on the camera body 1 at a position most suitable for the user's eye position, a view finder mounting assembly 60 is employed. The view finder mounting assembly 60 comprises an upper L-shaped arm 8 and a lower L-shaped arm 10 which is connected to the upper L-shaped arm 8 by means of a screw 9. One end of the lower L-shaped arm 10 is interposed or sandwiched between the bottom of the camera body 1 and an upper surface of the base member 11, while the other end of the lower L-shaped arm 10 is screwed to one end of the upper L-shaped arm 8. The electric view finder 7 is mounted on the other end of the upper L-shaped arm 8 in the same manner as described with reference to FIGS. 3, 4 and 5. Namely, the upper L-shaped arm 8 has a mount portion which is arranged in the same manner as shown in FIG. 5. It will be noticed from FIG. 6, that the electronic view finder 7 is positioned at the front portion of the top of the television camera body 1 in contrast to the position of the electronic view finder 7 of FIGS. 1 to 4. The position of the electronic view finder with respect to the television camera body 1 may be determined depending on the size of the shouldering aid 50 if attached as shown in FIGS. 1, 6 and 7. However, the electronic view finder 7 may be used without the shouldering aid 50. If the electronic view finder 7 is located at the rear portion of the camera body 1 as shown in FIGS. 1 to 4, the shooter may use one of his right and left eyes for looking through the eyepiece portion 7a.

From the above, it will be understood that the additionally provided electronic view finder 7 can be rotated from the position of FIG. 3 to the position of FIG. 4 so that the television camera equipped with the electronic view finder 7 can be readily restored in a casing, while mobility of the camera is not deteriorated even thought the electronic view finder 7 has the eyepiece which projects outside the camera body 1 beyond the width of the camera body 1. The above-described embodiments are just examples of the present invention, and therefore, it will be appararent for those skilled in the art that many modifications and variations may be made without departing from the spirit of the present invention.

What is claimed is:

1. A television camera assembly comprising:
   (a) a television camera body having a top and two sides which are substantially parallel to a camera axis passing through a lens attached to said television camera body and a subject to be viewed by said television camera;
   (b) an electronic view finder having a body mounted on or above the top of said television camera body, an eyepiece portion attached to one side of a body of said electronic view finder; and
   (c) means for pivotally mounting said body of said electronic view finder on or above the top of said television camera body so that said electronic view finder can be rotated between a position of use and a position of non-use through substantially 90 degrees in a plane parallel to the camera axis and perpendicular to said two sides of said television camera body, the electronic view finder including the eyepiece portion having a length less than its width in the direction of the camera axis, when in said position of use, said eyepiece portion projecting from one side of said television camera body when said electronic view finder body is rotated to said position of use whereby a user can readily look into said eyepiece portion when using said television camera assembly, and said eyepiece portion being positioned above and substantially contiguous with said television camera body when said electronic view finder body is rotated to the position of non-use whereby said eyepiece portion does not project substantially beyond the sides of said television camera body when viewed from the top, thereby reducing the effective width of said television camera assembly when altering it to the position of non-use.

2. A television camera assembly as claimed in claim 1, wherein said means comprises a shaft for rotatably supporting said electronic view finder above the top of said television camera body.

3. A television camera assembly as claimed in claim 2, wherein said means further comprises a guide pin provided at the bottom of said electronic view finder and an arcuate guide recess for receiving said guide pin.

4. A television camera assembly as claimed in claim 3, wherein said arcuate guide recess is formed centering said shaft over substantially 90 degrees.

5. A television camera assembly as claimed in claim 1, wherein the length of said electronic view finder measured in a direction perpendicular to a picture seen through the eyepiece thereof is substantially equal to the width of said television camera.

6. A television camera assembly as claimed in claim 1, wherein the length of said electronic view finder measured in a direction perpendicular to a picture seen through the eyepiece thereof is smaller than the width of said television camera.

7. A television camera assembly as claimed in claim 1, wherein said electronic view finder is mounted at a rear portion of said television camera body.

8. A television camera assembly as claimed in claim 1, wherein said means comprises a mounting assembly attached to said television camera body at the bottom and top thereof.

9. A television camera assembly as claimed in claim 8, wherein said mounting assembly comprises a lower L-shaped arm attached to the bottom of said television camera body, and an upper L-shaped arm detachably connected to said lower L-shaped arm, said upper L-shaped arm having a mount portion which can be placed on the top of said television body.

10. A television camera assembly as claimed in claim 9, wherein said electronic view finder comprises a guide pin provided at the bottom thereof, and wherein said mounting assembly comprises an arcuate guide recess for receiving said guide pin.

11. A television camera assembly as claimed in claim 9, wherein said electronic view finder is mounted at a front portion of said television camera body.

12. A television camera assembly comprising:
(a) a television camera body;
(b) an electronic view finder placed above the top of said television camera body, and having an eyepiece portion at one side thereof, said eyepiece portion projecting outside said television camera body, when in a position of use, when viewed from the top;
(c) means for pivotally mounting said electronic view finder so that said electronic view finder can be rotated to a position of non-use with said eyepiece portion positioned above and substantially contiguous with the top of said television camera body, said means having a shaft for rotatably supporting said electronic view finder above the top of said television camera body, a guide pin provided at the bottom of said electronic view finder, and an arcuate guide recess for receiving said guide pin.

13. A television camera assembly as claimed in claim 12, wherein said arcuate guide recess is formed centering said shaft over substantially 90 degrees.

14. A television camera assembly as claimed in claim 12, wherein said means comprises a mounting assembly attached to said television camera body at the bottom and top thereof, said mounting assembly having a lower L-shaped arm attached to the bottom of said television camera body, and an upper L-shaped arm detachably connected to said lower L-shaped arm, said upper L-shaped arm having a mount portion which can be placed on the top of said television camera body, said electronic view finder having a guide pin at the bottom thereof, said mounting assembly having an arcuate guide recess for receiving said pin.

* * * * *